United States Patent Office 3,513,425
Patented May 19, 1970

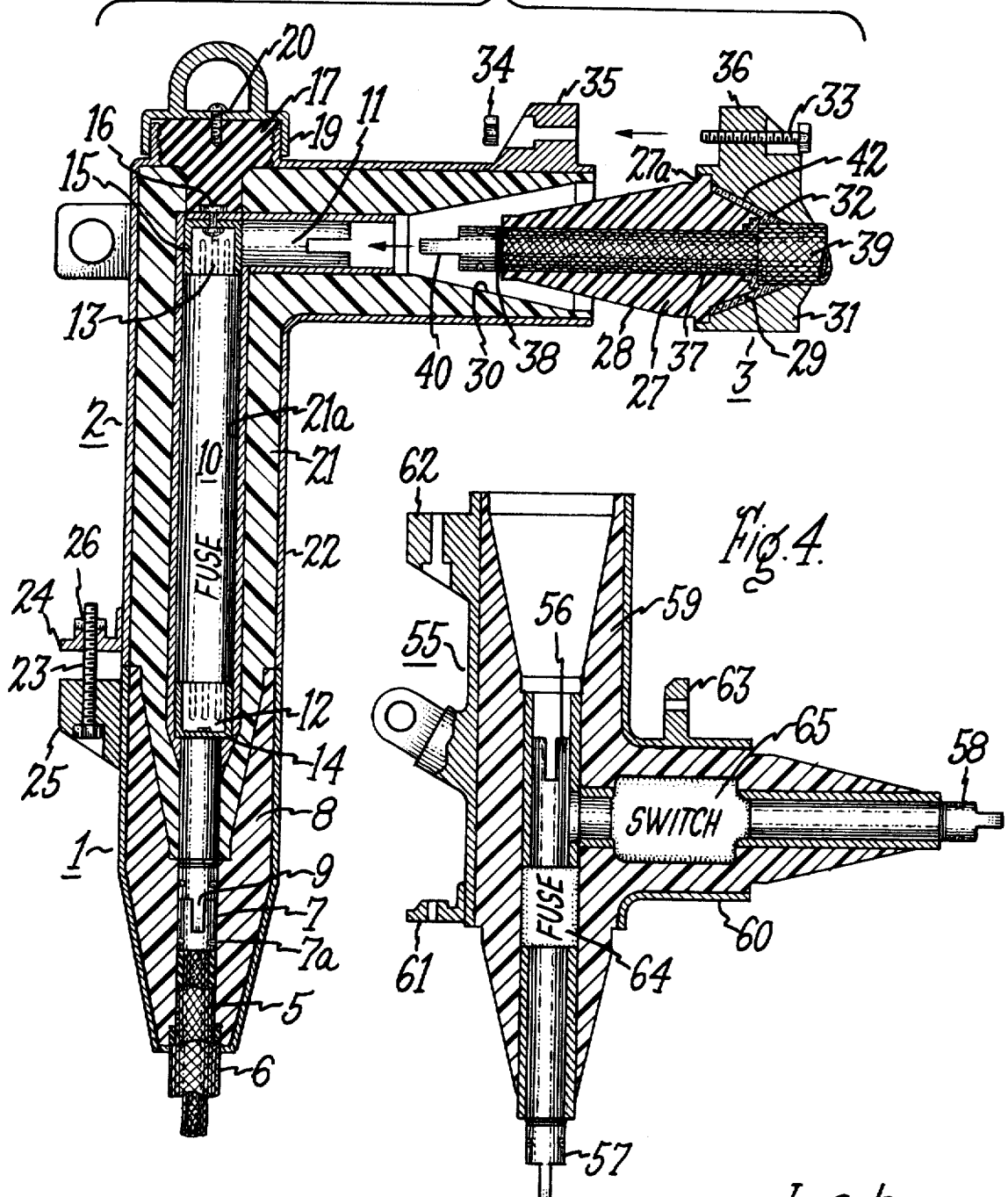

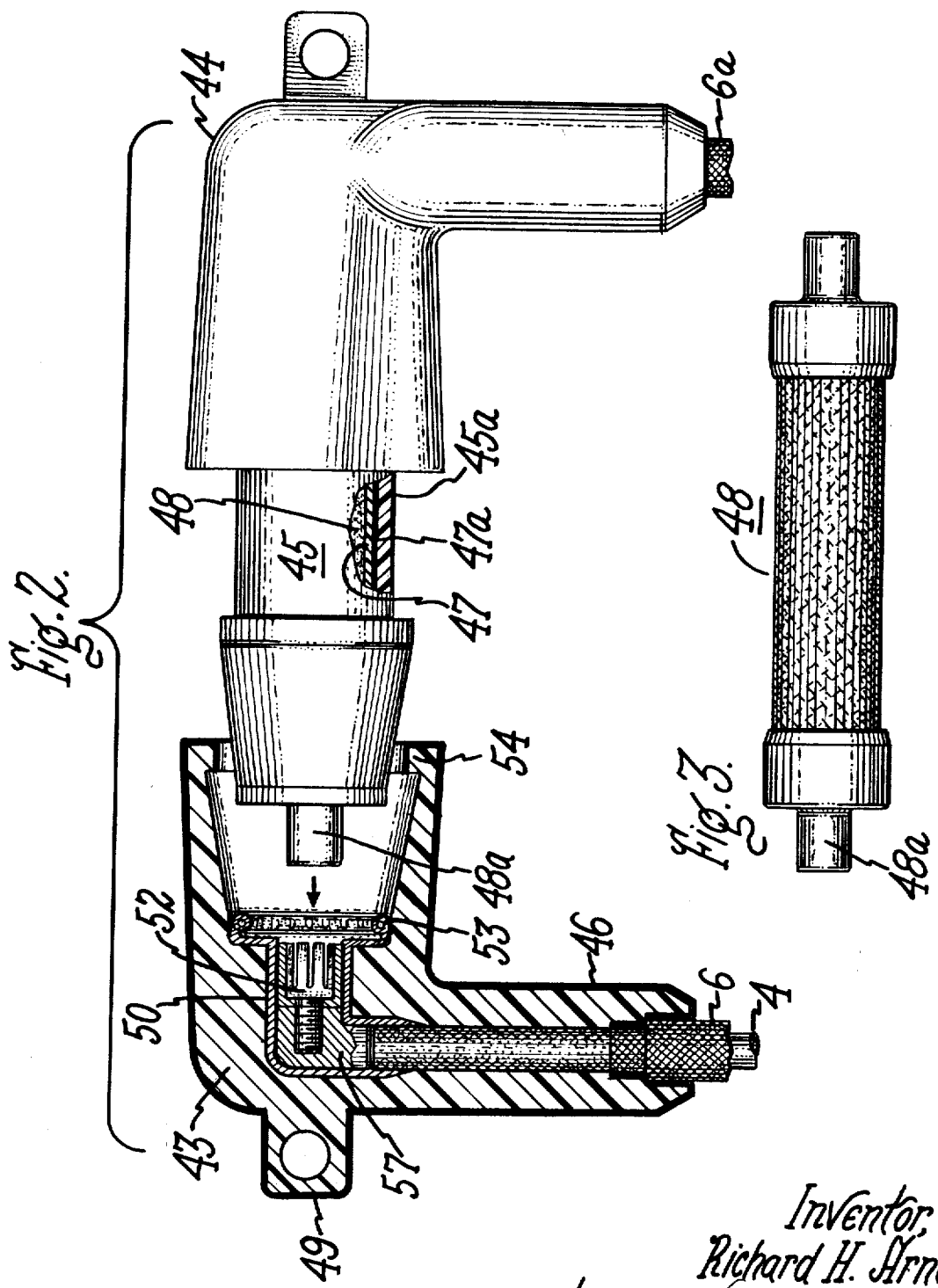

3,513,425
MODULAR ELECTRICAL CONDUCTOR
TERMINATION SYSTEM
Richard H. Arndt, Lenox, Mass., assignor to General
Electric Company, a corporation of New York
Continuation-in-part of application Ser. No. 697,668,
Jan. 15, 1968. This application May 21, 1969, Ser.
No. 826,515
Int. Cl. H01h 85/02; H02g 3/00; H01r 13/46
U.S. Cl. 337—201                           14 Claims

ABSTRACT OF THE DISCLOSURE

An electrical conductor termination system for high voltage underground power cables characterized by having a modular electric conductor termination that provides basic connecting and voltage-grading functions in combination with a variable plurality of additional functions that are incorporated in one or more additional interchangeable modules. A circuit interrupter or fuse is connected in the system within some of the modules.

---

This application is a continuation-in-part application of my earlier application Ser. No. 697,668, filed Jan. 15, 1968.

This invention relates to electric conductor terminations for high voltage shielded-cable conductors and more particularly to a modular concept for such terminations which reliably and economically provides maximum functional flexibility for termination junctions.

In high voltage underground electric power distribution systems, it is necessary to provide insulated terminations that afford suitable shielding and voltage grading for connecting the power conductors of the system to the various system components, such as distribution transformers and circuit breakers. Where such connecting terminations are located at relatively accessible points throughout the distribution system, it is a common practice to provide additional functions, such as voltage and current monitoring and overload protection. A common problem inherent in prior art high voltage cable terminations is that in order to provide such additional functions at existing terminations, it is usually necessary to remove the in-place termination from the conductor and replace it with a different termination that embodies the additional functions. Such a process is time consuming and expensive and frequently must be performed under relatively adverse conditions since most terminations are at remote points where a lineman must make the needed substitution with the portable equipment he has at hand.

A further common problem encountered in present underground high voltage power distribution systems arises from the fact that little standardization work has been done on the interfitting component parts of such systems; therefore, it is frequently necessary to completely replace a termination and re-dress the electric conductor cable on which it was mounted in order to adapt the termination to connect with a mating termination on a system component that was manufactured to different specifications than those incorporated in the line termination.

It is recognized that modular concepts have been introduced heretofore in low voltage electric power systems, such as those found in buildings and around industrial facilities. A familiar sight in households today is a wall socket, or terminal, that has a T-module plugged into it to accommodate a plurality of leads to a number of electric appliances. It is well known that such low voltage modules can be provided with switching or overcurrent protecting functions. However, it is not a simple or obvious matter to adapt the general idea of modular system construction demonstrated in low voltage systems for use in high voltage underground systems where corona and fault problems are present. In fact, it has long been common practice to distribute low voltage electric power in underground distribution systems, such as those used in airport lighting systems, but the experience gained from such systems is little more assistance in designing a satisfactory high voltage underground system that will be free of objectionable corona discharge and destructive excessive leakage currents caused by high voltage field conditions than is the knowledge derived from modular household distribution systems. A major distinction between high and low voltage systems lies in the expense inherent in the necessarily more complex components of high voltage systems, which makes it economically unfeasible to simply discard entire modules, e.g. a fuse module, when only a portion of it, such as a fuse therein, has failed. Accordingly, an object of my invention is to provide an economical, safe modular connecting and circuit interrupting function for a high voltage underground electric power distribution system.

Another object of my invention is to provide cable termination module accessories that afford standarized means for terminating high voltage shielded electrical conductors so that the resultant interfaces of such conductor terminations will be complementary and thus adapted for interchangeable connection.

A further object of my invention is to provide a modular accessory for conductor terminations, that coacts with such terminations to afford additional functions, such as switching and fuse protection at the termination, without necessitating the replacement of the existing termination.

An additional object of my invention is to provide a fused, shielded conductor termination that can be quickly and reliably installed on a conductor without having to re-dress the conductor insulation.

Other objects and advantages of the invention will become apparent from the following detailed discussion taken in conjunction with the drawings in which:

FIG. 1 is a side elevation, partly in cross section, of a conductor termination illustrating a preferred embodiment of a termination module constructed according to the teaching of my invention and adapted to connect with an "elbow" module that is also constructed pursuant to my invention.

FIG. 2 is a side elevation, partly in cross section, of another embodiment of my invention as adapted to a modular termination for a replaceable, cartridge type fuse.

FIG. 3 is a side elevation of a cartridge fuse of a type suitable for use with the embodiment of my invention shown in FIG. 2.

FIG. 4 is a side elevation view, in cross-section, of another modular conductor termination constructed pursuant to my invention.

Referring now to the drawings and particularly to FIG. 1, there is shown a conductor termination 1 mechanically and electrically connected to an elbow termination module 2 which is aligned with a basic termination module 3, all constructed according to some of the teachings of my invention. A conductor 4 sheathed in a concentric layer of insulating material 5, which in turn is protected by an outer braided metal grounding shield 6, has its exposed end electrically connected to a pre-formed aluminum terminal 7 that is crimped in place on the end of conductor 4 by detents 7a. The main body portion of termination 1 is formed of a moldable elastomeric insulating material 8 while the exterior surface of the termination 1 is metal clad, or otherwise rendered electrically conductive by coating it with a suitable conductive paint or tape dressing, so that it will be grounded when in contact with the grounded cable shield 6. It should be understood at the outset that although in the preferred forms of my invention illustrated herein the termination housing or body portions are formed of moldable elastomeric material, such as the material 8, other suitable insulating materials such as various common epoxy resins or moldable plastics, may be used to form these insulating members.

Elbow termination 2 is adapted to have electric current passed through it from a terminal 9 that slidably or threadably fits in the terminal 7 of termination 1 and is electrically engaged therewith, through a cartridge fuse 10 or other suitable loadbreak device, to a second terminal 11 at its other end. In this embodiment of the invention the conductive terminals 12 and 13 are slidably received in resilient copper sockets 14 and 15 respectively, which are slit as shown to form a plurality of inwardly biased fingers that securely grip fuse terminals 12 and 13 when fuse 10 is in operating position in module 2. Socket 14 is secured to terminal 9 by brazing or other suitable fastening means and socket 15 is secured by an imbedded rivet 16 to the insulated elastomeric body member 17 of a fuse cavity sealing cap 18. As shown in FIG. 1, cap 18 also comprises a threaded metal sleeve portion 19 which is secured to member 17 by being molded to it as well as by a screw 20 threaded therein. When fuse 10 is in the position shown, sleeve 19 forces the resilient insulating member 17 into water-tight sealing engagement with the insulating body 21 of moldule 2. It will also be seen that terminal 11 is in good electrical contact with socket 15 to complete the electrical circuit through module 2.

The electrically conductive portions of termination 2 are surrounded by a body of suitable insulating material 21, which in turn is covered by a conductive layer 22 that may be a metal housing, as shown, or as in other embodiments of the invention such as those discussed below, simply a suitable conductive tape or paint to provide a continuous ground potential plane around module 2. Molded in intimate contact with insulating body 21 is a sleeve-like member 21a of resilient conductive elastomeric material that serves to essentially eliminate corona discharge within module 2 due to its electrical contact with the conductive members in module 2, and due to the void-free junction between it and body 21. In order to attain a secure mechanical and electrical connection between termination 1 and elbow termination 2 any suitable tensioning and latching means may be provided. For example, such means are shown in FIG. 1 as a bolt 23 that is slidably inserted through brackets 24 and 25 formed on the respective terminations and rotatably secured in a conventional nut 26, which is adapted to threadably engage bolt 23 and secure it in position when the terminations 1 and 2 are moved into conductive relation.

In order to electrically connect a conductor to terminal 11 of elbow termination 2, a suitable high voltage termination means must be provided on the end of the conductor to grade the voltage between the conductor and its outer shield, as well as between it and the grounded sheath 22 of the termination 2. These basic termination functions are provided in the inexpensive and reliable termination module 3 which is constructed in accordance with the present invention. The module 3 comprises an elastomeric insulating member 27 having two frustoconical exterior surfaces 28 and 29 which are formed with their large diameter ends in substantially abutting relationship in the preferred embodiment of the invention illustrated in FIG. 1. The insulating member 27 is formed of moldable elastomeric material and the surface 28 is formed to complement the generally conical surface 30 of termination 2 so that when the two surfaces are moved into abutting relation they form a water-tight, voltage grading seal. A ferrule 31, which is formed of an electrically conductive metal in the embodiment depicted and has an inwardly sloped conical surface 32 thereon, shaped to complement the frustoconical surface 29 of insulating member 27, is provided to apply pressure to the member 27 so that it can be forced into water-tight engagement with the termination module 2. It will be understood that ferrule 31 is preferably formed of steel, but it can be formed of any rigid electrically conductive material capable of withstanding mechanical stress applied during operational use. A suitable tensioning means, again illustrated as a conventional bolt 33 and nut 34 adapted to engage the respective brackets 35 and 36 on terminations 2 and 3, is provided to force ferrule 31 against the insulating member 27 to move its surface 28 into engagement wtih surface 30 on termination 2. The interior surface of insulating member 27 defines a substantially cylindrical passageway longitudinally therethrough that is adapted to accommodate the exterior diameter of insulating sheath 37 on conductor 38 in a suitable force fit, as well as to flexibly engage a portion of the grounded shield 39. A standard size terminal 40 is fastened to the end of conductor 38 in any conventional manner, such as by crimping detents 41 on the terminal 40 into the outer surface of conductor 38.

An electrical circuit is completed between the grounded shield 39 and the conductive outer surface of the ferrule 31 by wrapping electrically conductive tape 42 around both the interior and exterior surfaces of the trailing end of insulating member 27 so that when the module 3 is in position on conductor 38, the tape 42 contacts both the grounded shield 39 and the ferrule 31. It will be understood that alternative means of assuring a good electrical contact between these members may be used; for example, a conductive material may be vaporized onto the surface of member 27. Of course, when bolt 33 is secured in nut 34 to retain module 3 in conducting relation with module 2, an electrically conducting circuit is formed through the bolt 33 to the exterior surface of module 2.

It has been found that by providing the insulating member 27 with a rearward sloping frustoconical surface 32 as illustrated in FIG. 1, a sufficient inwardly directed squeezing pressure is developed when the tensioning means 33 and 34 are tightened on the exterior surface of insulating sheath 37 to reliably secure these elements in their respective positions and, thus afford a dependable termination for conductor 38. It will be understood that when the tensioning means 33 and 34 are released, the entire termination module 3, including insulating member 27 and ferrule 31, can be quickly and easily removed from the end of conductor 38 by simply sliding them from their force-fit engagement with insulating sheath 37. Thus, it will be seen that a very simple and highly reliable termination module is provided, whereby a lineman can quickly and easily provide the basic voltage grading and connecting functions at a remote line connection without having to carefully dress or otherwise specifically prepare the cable for termination. It will be understood that the passageway through insulating member 27 is shaped to a standard diameter that closely complements the fairly well standardized respective outer diameters of distribution conductor insulating sheaths and grounded shields so that the ferrule 31 need not distort the flexible member 27 unduly to insure a watertight, voltage grading connection between it and the insulating sheath 37 or ground shield 39.

It will also be apparent to those skilled in the art that many of the particular configurations of the component parts of module 3 illustrated in FIG. 1 may be modified without departing from the scope of the invention. For example, it will be noted that in the embodiment of the invention illustrated in FIG. 1 the insulating member 27 is provided with an annular shoulder 27a which provides additional means for assuring a desirably snug fit between the member 27 and surface 30 of elbow termination 2 when the tensioning means 33–36 are used to force the terminations, 2 and 3, together. The shoulder 27a is engaged by ferrule 31 and prevents it from sliding with relation to conical surface 32. Thus, although the shoulder 27a is not necessary for satisfactory functioning of the basic termination module of the invention, it is a preferred embodiment and can be used to advantage with other forms of basic termination module insulating members constructed pursuant to the teaching of my invention. On the other hand, it will be seen that an important advantage of my invention stems from the fact that the respective interfitting terminals, such as socket terminals 7 and 11, and bayonet terminals 9 and 40 are interchangeable; therefore, once a standard size or thread gage has been selected for these elements, it should not be changed.

In operation of the embodiment of my invention illustrated in FIG. 1, when fuse 10 fails due to an overcurrent through it in excess of its rating, it can be replaced by unscrewing cap 18 from the threaded portion of metal housing 22 and withdrawing fuse 10 which is securely clamped in socket 15. It will be appreciated that the resilient fingers of socket 15 are designed to exert a substantially stronger holding force on fuse terminal 13 than that force exerted on the other fuse terminal by socket 14, so that fuse 10 is readily withdrawn from module 2 for inspection or replacement when necessary.

Now that the structure and functioning of a basic termination module 3 has been described, a further extension of the modular concept of my invention will be discussed with reference to FIG. 2. To more fully demonstrate the system flexibility that can be attained with my invention, there is shown in FIG. 2 a three-part, high voltage fuse module that is designed for use with a cartridge type, sand-filled current limiting fuse of the type depicted in FIG. 3 of the drawing.

The three separate parts of the module are; two substantially identical elbow portions, 43 and 44, and a central fuse holding body 45. Each of these members is formed of a moldable insulating elastomeric material and the outer surfaces of elbows 43 and 44 are entirely coated with a conductive resilient layer of paint, as shown in the cross-sectional view at 46 on elbow 43. Only the central cylindrical portion of body 45 is coated with a similar conductive layer of paint 45a. Thus, when the members 43, 44 and 45 are connected in operating relationship, a continuous ground plane is formed between the outer metal braided ground shield 6 of cable 4 (like reference numerals for like parts in FIG. 1 and 2) and the ground shield 6a of the cable terminated in module 44. In addition to its main elastomeric insulating body, the module 45 comprises an inner cylindrical sleeve 47 that projects approximately ⅛ inch beyond each end of the elastomeric body portion. This sleeve is formed of phenolic paper in the preferred embodiment of the invention but other suitable insulating materials such as an epoxy glass resin can be used to form cylinder 47 if desired. The internal diameter of sleeve 47 is large enough to slidably receive a cartridge fuse 48, such as that depicted in FIG. 3 of the drawing. As illustrated in FIG. 2, fuse 48 is shown in position in module member 45 with one terminal 48a thereof shown protruding from the end of the module 45.

As mentioned above, the modules 43 and 44 are substantially identical, accordingly, only the unique structural features of module 43 will be described in detail to explain the invention. An integral elastomeric hook stick ring 49 is molded in the elbow module 43 to provide a means for engaging a lineman's hookstick with the module to connect and disconnect it when the system is live or "hot." As shown in FIG. 2, the conductive coating 46 on module 43 is extended around the two extreme ends of module 43 to a point where it is in firm contact with the shield 6 on cable 4 on one end, and with the conductive outer coating 45a on module 45 on the other end when the fuse module is in assembled position. This arrangement provides a continuous conductive layer on the outer surface of the three-part module to prevent voltage stresses from being developed when the system is energized in the manner discussed above with reference to FIG. 1. Also, a resilient conductive, molded inner sleeve member 50 is positioned around the elbow portion of the interior of module 43 and bonded to its insulating body to prevent corona discharge from the irregular surfaces of terminal 51 on the end of conductor 4 or from the cartridge-receiving socket 52 that is screwed into the terminal 51. Finally, an annular spring 53 is molded into the body portion of module 43 to provide good electrical contract between the conductive sleeve 50 and the area of the module 43 encompassed by annular spring 53, thereby to obviate the formation of corona discharge across this space to terminal 48a of fuse 48.

As can be seen in FIG. 2, when the fuse module 43–45 is separated, the fuse 48 can be readily removed from the body portion 45 of the module by simply grasping terminal 48a and sliding the fuse out, then another fuse can be inserted in its place. On the other hand, when the components of the fuse module 43–45 are in operating position, a water-tight seal is provided between the respective engaging resilient surfaces and proper corona shielding and voltage grading is afforded by the conductive outer coatings 45a, 46a and inner sleeve member 50, in the manner described above. It will be appreciated that the annular lip portion 54 on module 43 has an inner diameter that, in its undilated condition, is slightly smaller than the outside diameter of the cylindrical portion of module 45 so that in operating position a water-tight seal is formed between these parts. Additionally, the frusto-conical and surfaces of module 45 afford optimum voltage grading between the inner conductive members terminated by spring 53 and the grounded coatings 45a–46. A suitable layer 47a of high resistance conductive material, such as silicon carbide, is painted on the exterior surface of liner 47 to prevent corona discharge from fuse 48. This use and design of such a high resistance layer of conductive material is a separate invention and any right to it is disclaimed by the present inventor.

It will be appreciated by those skilled in the art that conductor termination junctions, such as the one formed by modules 1 and 3, occur at numerous spaced points in high voltage underground power distribution systems. To further enhance the flexibility of such system there is shown in FIG. 4 of the drawing another embodiment of my invention comprising a T-connector module 55 having a plurality of electrically interconnected line terminals 56, 57 and 58. The insulating body 59 of module 55 is formed of moldable elastomeric material and the outer surface of the module is encased in conductive metal sheath 60 for the reasons explained above with reference to sleeve 22 shown in FIG. 1. In addition, a bolt-bearing bracket 61 and bolt receiving brackets 62 and 63 are provided to afford means for releasably securing module 55 in operating relation with respect to other modules, as described above with reference to tensioning means 33–36.

Graphically depicted in line with outlet terminals 56–58 of module 55 is a fuse 64 and a switch 65, which represent two types of circuit interrupting functions that may be built into the interchangeable high voltage termination modules of my invention. It will be understood that fuse 64 may be of a type similar to that described with reference to FIG. 1 above, and the switch 65 may be any suitable type, such as an arc-gas actuated switch of the type disclosed and claimed in co-pending U.S. patent application Ser. No. 707,779, filed Feb. 23, 1968, and assigned to the same assignee as this invention.

In operation of the module 55, it will be appreciated that it can be inserted in a system as shown in FIG. 1 either in place of module 2 or as a supplement to it, with terminal 56 connected to line terminal 41 and terminal 57 connected to line terminal 9, leaving outlet terminal 58 to be connected to another (unshown) branch of the system.

It will be understood that while particular embodiments of my invention have been shown and described herein, it will be apparent to those skilled in the art that various modifications may be made without departing from the true scope and spirit of the invention, therefore, it is intended by the appended claims to cover all such modifications as fall within the scope of the invention.

What I claim as new and desire to secure by Letters Patent of the United States is:

1. An accessory for high voltage electric power conductor terminations of the type having first and second conductor terminations with respective end surfaces that form a water-tight, voltage grading seal therebetween when moved into juxtaposition to detachably connect their respective conductor terminals in electrically conducting relation, comprising a module releasably positioned between the respective end surfaces of said first and second terminations, insulated electrically conductive means in said module, means for electrically connecting the respective conductor terminals in said termination to said conductive means whereby a current carrying circuit is completed between said terminals through said module, means for forming water-tight uniform voltage grading seals between the ends of said module and the respective terminations when said current carrying circuit is completed, and current interrupting means mounted within said module for interrupting the current carrying circuit between said terminals.

2. An accessory as defined in claim 1 including an electrical outlet terminal disposed on said module and electrically connected to said conductive means.

3. An accessory as defined in claim 1 including a pluraliy of electrical outlet terminals disposed on said module, each of said terminals being electrically connected to said conductive means.

4. An accessory as defined in claim 1 including means for selectively actuating said interrupting means.

5. An accessory as defined in claim 4 wherein said means for selectively actuating the interrupting means comprises temperature responsive means.

6. An accessory as defined in claim 4 wherein said means for selectively actuating the interrupting means comprises means responsive to variations of magnitude in the current flowing through said means for electrically connecting the respective terminals.

7. An accessory as defined in claim 1 wherein said current interrupting means comprises a current limiting fuse.

8. An accessory as defined in claim 1 wherein said current interrupting means comprises a cartridge-type fuse that is removably mounted in said module.

9. An accessory as defined in claim 1 wherein said current interrupting means comprises a switch having arc-extinguishing means adjacent its current interrupting contacts to prevent the formation of excessive amounts of arc-generated gases.

10. An accessory for high voltage electric power conductor terminations of the type having first and second conductor terminations with respective end surfaces that form a water-tight, voltage grading seal therebetween when moved into operating position to detachably connect their respective conductors in electrically conducting relation comprising, a module adapted to be releasably positioned between the respective end surfaces of said first and second terminations, said module having first and second end surfaces that are generally frusto-conical and respectively substantially complement the end surfaces of said first and second terminations to form a water-tight uniforming voltage graded seal therewith, insulated electrically conductive means in said module forming a conductive circuit between the first and second end surfaces of said module, a cartridge-type fuse mounted in said module and positioned in series with said circuit for interrupting said circuit when a predetermined over-current passes therethrough, and means for electrically connecting the respective conductor terminals in said terminations to said conductive means adjacent opposite ends of said fuse whereby an electric circuit is completed between said terminals through said fuse.

11. An accessory as defined in claim 10 including means for removing said cartridge fuse from said module comprising a fuse-engaging resilient terminal mounted on an electrically shielded water-tight sealing cap that is releasably fastened to said module and manually removable therefrom, said resilient terminal being effective to maintain said fuse in engagement with it when it is removed from said module.

12. A three-part fuse module for high voltage electric power conductors comprising first and second conductor termination modules and a fuse supporting module, said first and second modules having respectively generally frusto-conical end surfaces that form water-tight, voltage grading seals with opposite ends of the fuse supporting module when coupled in operating position therewith, a liner of insulating material within said fuse supporting module formed to accommodate a cartridge-type fuse and maintain its terminals in electrical contact with the terminals of said terminations and means for electrically connecting the respective conductor terminals in said terminations to opposite ends of a cartridge-type fuse positioned in said liner whereby an electric circuit is completed between said terminals by a fuse mounted in said liner.

13. A three-part fuse module as defined in claim 12 wherein said fuse supporting module is resilient secured in position with respect to said termination modules by a pair of interlocking annular lips on said termination modules that respectively engage annular ridges on said fuse suupporting module adjacent the outer-most end of said water-tight seal.

14. An accessory as defined in claim 12 including a pair of annular spring members disposed adjacent the opposite ends of said liner and electrically connected with a layer of conductive material on said liner and the terminals of said termination modules when said module is in operating position, thereby to prevent corona discharges from occurring between a fuse in said liner and the liner.

References Cited

UNITED STATES PATENTS

| 2,852,596 | 9/1958 | Prince | 174—73 |
| 2,910,625 | 10/1959 | Carpenter | 337—263 X |
| 3,085,138 | 4/1963 | Brown et al. | 337—192 |
| 3,124,406 | 3/1964 | Cook | 339—143 X |
| 3,243,756 | 3/1966 | Ruete et al. | 174—73 X |
| 3,281,558 | 10/1966 | Weber | 337—201 X |
| 3,307,137 | 2/1967 | Tordoff et al. | 339—61 |
| 3,323,097 | 5/1967 | Tordoff | 174—73 X |
| 3,356,806 | 12/1967 | Urani | 337—205 X |
| 3,376,541 | 4/1968 | Link | 174—73 X |

H. B. GILSON, Primary Examiner

U.S. Cl. X.R.

174—73; 339—143

Notice of Adverse Decision in Interference

In Interference No. 97,875 involving Patent No. 3,513,425, R. H. Arndt, MODULAR ELECTRICAL CONDUCTOR TERMINATION SYSTEM, final judgment adverse to the patentee was rendered Nov. 30, 1973, as to claims 1, 2, 3, 4, 5, 6 and 7.

[*Official Gazette February 26, 1974.*]